United States Patent
Wang et al.

(10) Patent No.: US 9,176,011 B2
(45) Date of Patent: Nov. 3, 2015

(54) SINGLE WIRE ANALOG OUTPUT SENSOR ARCHITECTURE

(71) Applicant: Microchip Technology Incorporated, Chandler, AZ (US)

(72) Inventors: Ge Wang, Chandler, AZ (US); Ezana H. Aberra, Chandler, AZ (US); Ronaldo Francisco, Gilbert, AZ (US); Chi Lung Wong, Gilbert, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 269 days.

(21) Appl. No.: 13/786,459

(22) Filed: Mar. 6, 2013

(65) Prior Publication Data

US 2014/0254630 A1   Sep. 11, 2014

(51) Int. Cl.
| | |
|---|---|
| *G01K 7/00* | (2006.01) |
| *G01L 9/12* | (2006.01) |
| *G01K 7/34* | (2006.01) |
| *G01K 7/20* | (2006.01) |

(52) U.S. Cl.
CPC .. *G01K 7/34* (2013.01); *G01K 7/20* (2013.01); *G01K 2215/00* (2013.01)

(58) Field of Classification Search
None
See application file for complete search history.

(56) References Cited

U.S. PATENT DOCUMENTS

| | | | | |
|---|---|---|---|---|
| 4,219,737 | A * | 8/1980 | Gagnon et al. | 250/570 |
| 4,763,063 | A * | 8/1988 | Shkedi | 324/685 |
| 6,438,502 | B1 | 8/2002 | Awtrey et al. | 702/130 |
| 7,015,841 | B2 * | 3/2006 | Yoshida et al. | 341/120 |
| 7,052,176 | B2 * | 5/2006 | Stephan et al. | 374/122 |
| 7,204,638 | B2 * | 4/2007 | Hsu | 374/1 |
| 7,298,132 | B2 * | 11/2007 | Woolsey et al. | 324/117 H |
| 7,449,891 | B2 * | 11/2008 | Cawthorne | 324/427 |
| 2010/0223476 | A1 | 9/2010 | Maletsky et al. | 713/189 |

OTHER PUBLICATIONS

International Search Report and Written Opinion, Application No. PCT/US2014/019138, 10 pages, Jun. 12, 2015.

* cited by examiner

*Primary Examiner* — Peter Macchiarolo
*Assistant Examiner* — Jermaine Jenkins
(74) *Attorney, Agent, or Firm* — Slayden Grubert Beard PLLC

(57) ABSTRACT

A analog integrated sensor device has an interface with only a single ground line and a single signal line configured to receive power and output an analog value. A power capacitor is coupled between the ground line and the single signal line. An analog sensor circuitry is operable to be powered by the power capacitor and further operable to output an analog output signal on the single signal line once the power capacitor has bee charged sufficiently.

25 Claims, 3 Drawing Sheets

SINGLE WIRE ANALOG OUTPUT SENSOR ARCHITECTURE

TECHNICAL FIELD

This application concerns analog sensor devices, in particular analog sensor devices that can be coupled with a microcontroller or detector device.

BACKGROUND

Analog sensors, for example, thermistors are widely used in various applications to measure temperature. They can be connected via a "single wire interface" as shown in FIG. 1A. Their outputs, however are nonlinear, which requires an algorithm table for interpretation that is usually processed by a microcontroller which is coupled with one of its analog input ports with the thermistor. Thus, as shown in FIG. 1A, the sensor device 110 basically consists of a thermistor 115 which is connected through a so-called "single-wire" interface 130 with an analog input port 122 of a microcontroller 120. The "single-wire" interface in fact uses two wires wherein the second wire is generally coupled to ground as a reference potential. In many environments such as, for example, vehicles, the ground connection is provided by the chassis and therefore may require only a very short wire or no wire at all if the sensor is mounted to the chassis. Thus, only the wire connected to pin 122 carries the actual analog information.

Such a sensor device also consumes power in the range of 2-3 mA which can be detrimental in certain low power applications. Moreover, the microcontroller must either provide for the necessary power supply or external circuitry must be provided to supply the thermistor with power. For example, a constant current source coupled with an analog input port or external circuitry that provides the necessary signals must be present as will be discussed in more detail below with respect to integrated active thermistors.

Unlike resistive sensors such as thermistors, there also exist linear active thermistor devices in the form of an integrated circuit device which do not require an additional signal-conditioning circuit and only consume current in the range of about 0.1 mA. The biasing circuit development overhead as mentioned above for thermistor solutions can be avoided by such a device. FIG. 1B shows the basic two measurement principles used in such an integrated device. On the left side there is shown a device that provides for current output wherein the temperature proportional current can be in the range of, for example, 1 $\mu$A/K. The equivalent circuit on the right side shows a solution for a voltage sensor that produces for example a temperature proportional voltage of 10 mV/K. The additional compensation circuit for providing a linearly proportional output signal is not shown in FIG. 1B. However, as can be seen in FIG. 1B, such devices require at least another pin for the power supply V.

SUMMARY

Hence, a need exists for an improved sensor device, in particular a sensor device for measuring temperature.

According to an embodiment, an analog integrated sensor device may comprise an interface with only a single ground line and a single signal line configured to receive power and output an analog value, a power capacitor coupled between the ground line and the single signal line, and analog sensor circuitry operable to be powered by the power capacitor and further operable to output an analog output signal on the single signal line once the power capacitor has bee charged sufficiently.

According to another embodiment, an analog integrated sensor device may comprise an interface with only a single ground line and a single signal line configured to receive power and output an analog value, another interface for coupling an external power capacitor between the ground line and the single signal line, and analog sensor circuitry operable to be powered by the power capacitor and further operable to output an analog output signal on the single signal line once the power capacitor has bee charged sufficiently.

According to a further embodiment of one of the above integrated sensor devices, the analog sensor circuitry may comprise an analog sensor unit coupled with a sensor output unit, wherein the sensor output unit feeds an analog output signal to the single signal line. According to a further embodiment, the sensor device may further comprise a forward biased diode connected between the single signal line and the internal or external power capacitor. According to a further embodiment, the sensor device may further comprise a controllable switch connected between the single signal line and the internal or external power capacitor and a switch control unit operable to control the switch. According to a further embodiment, the controllable switch can be a MOSFET. According to a further embodiment, the switch control unit can be configured to automatically control the switch to decouple the internal or external power capacitor from the single signal line once a predefined charge level has been reached. According to a further embodiment, the analog output signal can be a voltage or a current. According to a further embodiment, the analog sensor circuitry can be configured to output the analog output signal at least during a predefined time window after the internal or external power capacitor of the sensor device has been sufficiently charged. According to a further embodiment, the analog sensor circuitry can be further configured to indicate an end of a measurement cycle by pulling down the single signal line.

According to another embodiment, a method for operating an integrated sensor device through an interface having only two lines, wherein one line is a ground connection and the other line is a signal line, may comprise the steps: applying a supply voltage to the signal line by a controller coupled with the integrated sensor device through the interface for a predetermined time; performing an analog sensor measurement within the integrated sensor device; outputting an analog sensor signal on the signal line by the integrated sensor device; and measuring the analog sensor signal by the controller.

According to a further embodiment of the method, the controller can be a microcontroller and the signal line is connected to an input/output (I/O) port of a microcontroller, wherein the I/O port is configured to operate at least as a digital output port or as an analog input port. According to a further embodiment of the method, the microcontroller can be programmed to perform the method steps. According to a further embodiment of the method, the method may further comprise the step of pulling down the signal line by the integrated sensor device after a time period has passed from said predetermined time period to indicate the end of a measuring cycle. According to a further embodiment of the method, the pulling down can be performed multiple times.

BRIEF DESCRIPTION OF THE DRAWINGS

A more complete understanding of the present disclosure may be acquired by referring to the following description taken in conjunction with the accompanying drawings wherein.

Figure 1A:
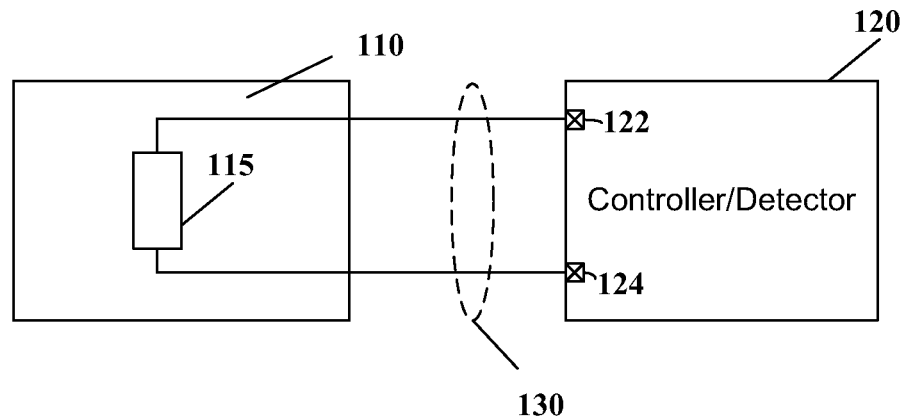
FIG. 1A shows a typical arrangement of a thermistor coupled with a microcontroller using a "single wire£ interface.
Figure 1B:
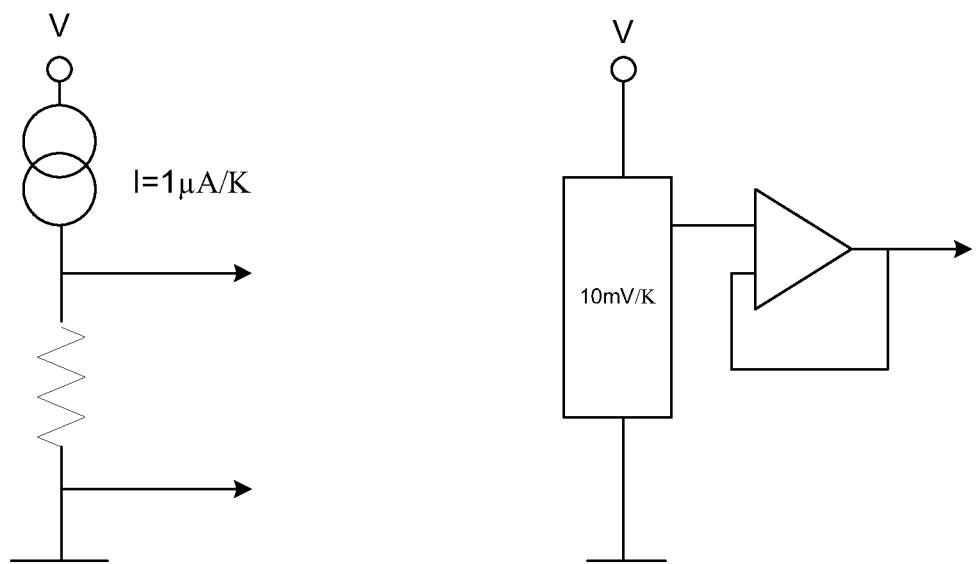
FIG. 1B shows current and voltage temperature sensors.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents.

DETAILED DESCRIPTION

According to various embodiments, a true "single-wire" temperature sensor for remote location measurement can be provided. As explained above a "single-wire" interface is to be understood as an interface that requires a single signal line and a reference ground connection. The solution according to various embodiments provides a way to measure a temperature by subjecting an integrated analog sensor device through the signal wire to a $V_{DD}$ voltage for a specified amount of time and then remove the $V_{DD}$ for a wait period and then measure the voltage across the same $V_{DD}$ pin which is applied to the signal line by the measurement device within the integrated analog sensor device.

The voltage supplied to the signal line which will be maintained only for a small window of time will represent a device or measured temperature. Thus, according to various embodiments, an architecture for a true "single-wire" communication analog output sensor can be provided. The sensor only needs a signal wire for both power supply and signal output and one additional wire for a ground node. Thus, a two wire temperature sensing can be provided in particular in connection with a microcontroller having a standard I/O output port that can be configured to perform an analog measurement.

Such a device according to various embodiments, as will be explained in more detail below, may operate in a predefined temperature range within, for example, −40° C. to 125° C. and can replace those thermistor applications in the same temperature range. Moreover, manufacturing costs of such a device can be cheaper than that of a thermistor/RTD applications.

The device according to various embodiments can also save power because the thermistor application according to various embodiments only requires 50 uA to run, whereas typical conventional thermistor application require ~1 mA to run.

Figure 2:
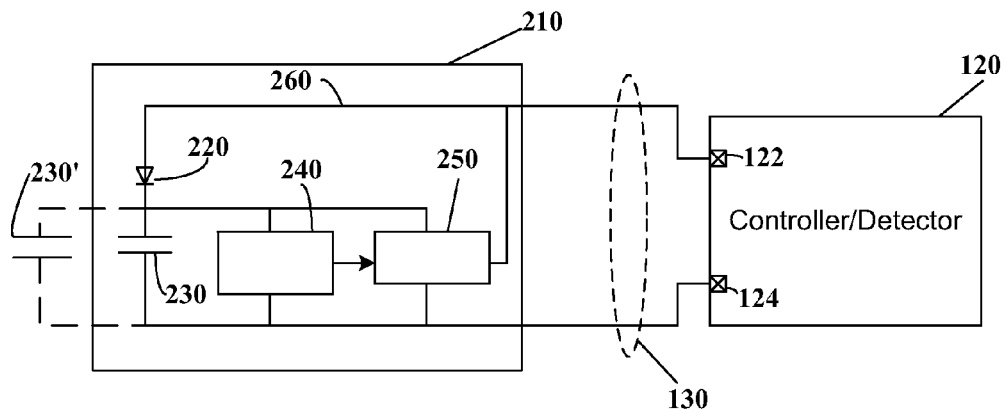
FIG. 2 shows a first embodiment of a "single-wire" integrated temperature sensor device.

As shown in FIG. 2, the sensor device 210 comprises an additional power capacitor 230 to supply power supply of the analog sensor circuit 240. According to one embodiment, this capacitor 240 is implemented on chip. However, as indicated by the dotted connection in FIG. 2, such a capacitor 230' could also be provided externally instead of the internal capacitor 230. As shown in FIG. 2, a true two wire connection 130 can be achieved. As explained above in more detail, in the industry, such an interface will be called a "single-wire" connection since it only has one wire for output communication.

According to various embodiment, the power supply capacitor 230 or 230' needs to be only periodically charged as the circuit does not consume a lot of power. To separate the power supply from the signal output line 260, internally a diode 220 is provided that is forward biased between the input of the sensor device 210 and the power capacitor 230, 230'. The power supply capacitor 230 provides a supply voltage internally to the analog sensor circuit 240. This sensor circuit 230 may provide for a temperature sensor. However, other sensors that require power may be implemented according to various embodiments. Furthermore, the analog sensor circuit may also include linearization circuitry or other further processing circuitry that is necessary to condition the measurement signal. As shown in FIG. 2 an output signal of the analog sensor circuit 240 is forwarded to a sensor output unit 250. This output unit 250 is also supplied with power by capacitor 230, 230'. This output unit 250 may be designed to convert the output signal to an analog voltage or current. Furthermore, this unit may include respective switching circuitry to decouple the output from the signal line 260 if necessary.

Figure 3:
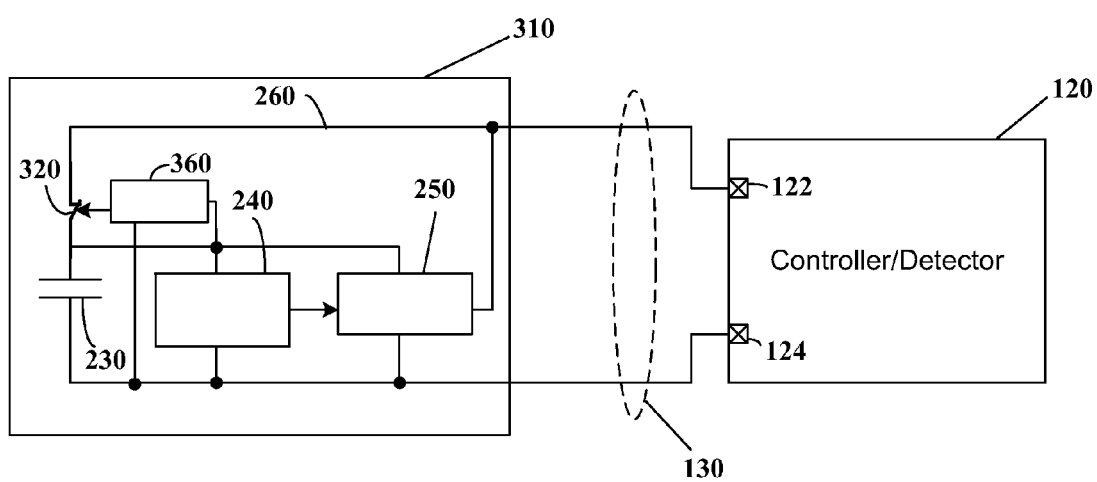
FIG. 3 shows a second embodiment of a "single-wire" integrated temperature sensor device.

FIG. 3 shows another embodiment in which the diode 220 is replaced by a controllable switch 320. Controllable switch can be preferably implemented by a transistor, for example, a MOSFET. Furthermore, a switch control unit 360 may be implemented to control switch 320. The switch control unit 360 can also be powered by the power supply capacitor 230, 230'. The switch 320 can be designed to be in the closed position when the device 310 is not powered to allow the capacitor 230 to be charged when the device 310 is powered up for the first time.

FIGS. 2 and 3, therefore show two configurations. The embodiment of FIG. 2 uses diode 220 to separate the power capacitor and the output line 260. This embodiment can result in a chip supply voltage one diode voltage drop from the external power supply. The configuration according to FIG. 3 uses a switch so separate the power capacitor 230 and the output line 260. In this embodiment, the power supply of the sensor device 310 can be very close to the external power supply provided by the microcontroller 120.

Figure 4:
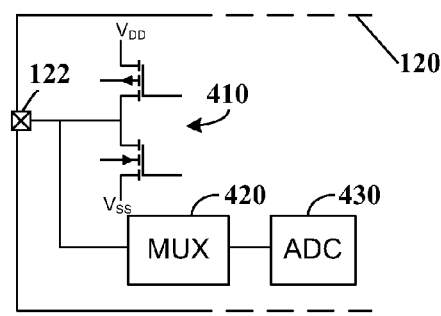
FIG. 4 shows a typical external pin of microcontroller and associated internal circuitry.

As shown in FIGS. 2 and 3, the "single-wire" interface uses a single signal line connected to an I/O port pin 122 of microcontroller or detector device 120 and a ground connection through a ground pin 124. FIG. 4 shows a suitable circuitry coupled with pin 122 of the microcontroller or detector device 120. Generally a microcontroller comprises a plurality of input/output (I/O) ports that are used to output or input digital signals. As shown in FIG. 4, for digital output purpose, such a digital I/O port 410 comprises complementary MOSFET transistors that are controlled for example by a single bit in an associated output register. The digital I/O circuitry may further comprise integrated pull-up and/or pull down logic and the drive capabilities of the digital drive may also be adjustable. In addition digital input logic may be present (not shown in FIG. 4). Furthermore, many controllers, system on chips, or other devices comprise configurable logic that allows to switch the I/O port pin to allow connection to an integrated analog-to digital converter (ADC). FIG. 4 shows an example of such circuitry. Here, the device may have a plurality of I/O pins 122 that can be configured as analog input ports. To this end, one input of a multiplexer 420 is connected with port pin 122. Other inputs of the multiplexer 420 connect to other pins of the device 120. The output of multiplexer 420 is connected with the input of ADC 430. The entire port can be configured via respective configuration registers. One or may configuration register may be provided to set up the correct configuration of associated pin 122. For example, in digital output mode, the multiplexer 420 can be controlled to disconnect all inputs from its output. Alternatively an additional switch may be provided between pin 122 and the input of multiplexer 420. In analog input mode, the digital driver 410 may be disabled and a connection between pin 122 and ADC 430 can be enabled through multiplexer 420 and if necessary additional switching circuitry.

For interfacing with a sensor device 210, 310 according to various embodiments, the following method may be applied. First, pin 122 is configured to be in digital output mode and the high side MOSFET is controlled to connect pin 122 with the internal power supply $V_{DD}$. In other words a digital "1" is output through pin 122. The digital output driver 410 maintains this coupling for a predetermined time to charge power capacitor 230 and may then be controlled to decouple the digital driver from pin 122. Through this connection and setting, internal or external capacitor 230, 230' is charged sufficiently to supply the internal analog sensor circuit 240 and output unit 250 with power. The charge time for capacitor 230, 230' is chosen to be sufficient to perform one or more measurement cycles. Once fully charged, in case of the embodiment of FIG. 3, switching logic 360 decouples capacitor 230 from line 260. As stated above, microcontroller 120 also decouples the digital driver 410 and switches pin 122 into analog input mode. After analog sensor circuitry performed its measurement such as using a thermistor or other temperature sensor integrated within analog sensor circuit 240, the respective output value is forwarded to sensor output unit 250 which now applies an output voltage or output current to signal line 260.

The sensor device 210, 310 may be specified to ensure that a specific time window after receiving power through the signal line 260 is available for measuring valid sensor data. Thus, a measurement cycle can be divided into, for example, four consecutive time slots. A first time slot defines the time required to charge power capacitor 230, a following time slot defines the time for internal power-up and measurement, in particular settlement times, a following third time slot defines the time window during which a valid analog output signal is available on signal line 260, and a following last time slot may be used for power down the device to allow repetition of the measurement cycle. To this end, output device 250 may include a pull down transistor for substantially pulling down the signal on signal line 260. Thus, it could be indicated to the microcontroller 120 that the sensor device 210, 310 is in stand-by mode ready to receive a power-up pulse and perform another measurement. Other signals could be used to indicate the end of a cycle, for example, a sequence of pull down pulses could be used to indicate that the current output value is not valid anymore. Also, according to another embodiment, a predefined time after start-up may simply be used to indicate to the microcontroller that no valid measurement can be made. Such time values could be monitored entirely within the microcontroller without any additional output by the sensor device.

Figure 5:
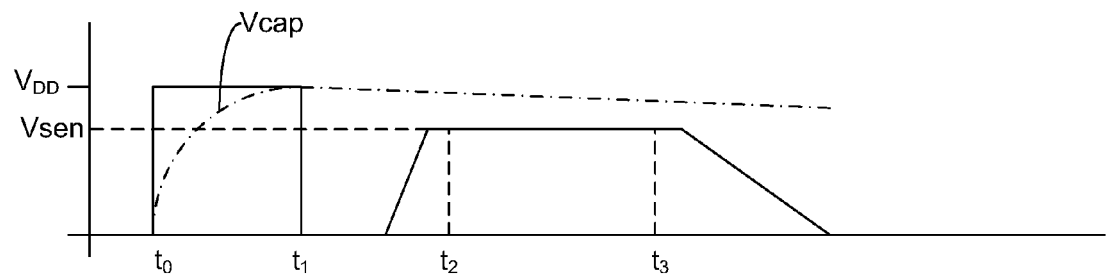
FIGS. 5 and 6 show exemplary timing diagrams.
Figure 6:
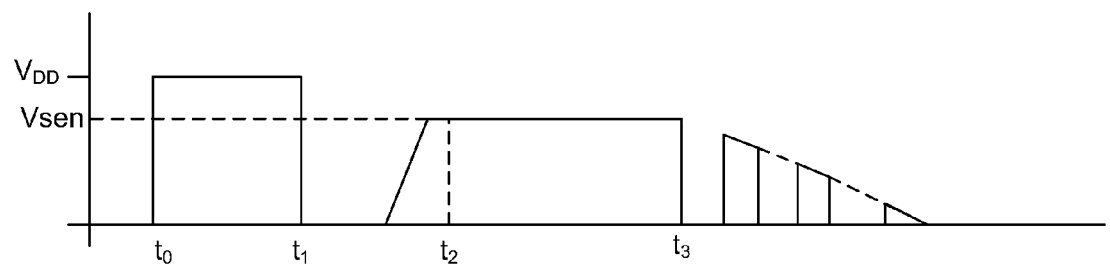

FIGS. 5 and 6 show exemplary timing diagrams in accordance with the above described operation methods. For example, the timing diagram of FIG. 5 shows that the microcontroller 120 asserts a logic "1" at its output 122 during the time window $t_0$ to $t_1$. Thus, the solid line represents the voltage on signal line 260. The dash-and-dotted line $V_{cap}$ represents the voltage across power capacitor 230. The sensor device 210, 310 is now sufficiently powered to perform a measurement. As shown in FIG. 5 the voltage across power capacitor 230 slowly decreases as the circuitry powered by the capacitor 230 discharges the capacitor. The power supply $V_{cap}$ stays however above a certain threshold value for example until time $t_3$ to ensure that the device can output a valid signal.

The time slot $t_1$ to $t_2$ may be needed to perform the measurement and comply with certain settlement times of the respective sensor in analog sensor circuitry 240. As shown in FIG. 5 starting at time $t_2$ a valid output voltage is applied to signal line 260. Thus, microcontroller 120 may now perform a analog-to-digital conversion using its ADC 430 during time window $t_2$ to $t_3$.

FIG. 6 shows a similar timing diagram. In addition, the sensor device 210, 310 may be configured to pull-down signal line 260 before the output data becomes invalid. According to various embodiments as shown in FIG. 6 a single pull-down pulse (as indicated by the dotted lines) or multiple pull-down pulses may be applied after time $t_3$ to indicate a stand-by mode to microcontroller 120.

The sensor device 210, 310 may be preferably a temperature sensor device that at least requires to be powered by a power source. In addition certain signal processing may be necessary as discussed above and can be performed within the device to provide for a linearly proportional output value. Other sensors that have similar requirement may also benefit from this concept and can be easily implemented with a sensor device according to various embodiments.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A analog integrated sensor device comprising:
   an interface with only two connecting lines including a ground line and a signal line, wherein the signal line is configured to receive power and to output an analog value;
   a power capacitor coupled between the ground line and the signal line and configured to be charged when a supply voltage is fed to the signal line during a charging time period;
   analog sensor circuitry operable to be powered by the power capacitor and further operable to output an analog output signal on the signal line during an output time period once the power capacitor has been charged sufficiently.

2. The sensor device according to claim 1, wherein the analog sensor circuitry comprises an analog sensor unit coupled with a sensor output unit, wherein the sensor output unit feeds an analog output signal to the signal line.

3. The sensor device according to claim 2, wherein the analog output signal is a voltage.

4. The sensor device according to claim 2, wherein the analog output signal is a current.

5. The sensor device according to claim 1, further comprising a forward biased diode connected between the signal line and the power capacitor.

6. The sensor device according to claim 1, further comprising a controllable switch connected between the signal line and the power capacitor and a switch control unit operable to control the switch.

7. The sensor device according to claim 6, wherein the controllable switch is a MOSFET.

8. The sensor device according to claim 6, wherein the switch control unit is configured to automatically control the switch to decouple the power capacitor from the signal line once a predefined charge level has been reached.

9. The sensor device according to claim 1, wherein the analog sensor circuitry is configured to output the analog output signal at least during a predefined time window after the power capacitor of the sensor device has been sufficiently charged.

10. The sensor device according to claim 9, wherein the analog sensor circuitry is further configured to indicate an end of a measurement cycle by pulling down the signal line.

11. A analog integrated sensor device comprising:
 an interface with only two connections coupled with a first and second external pin, wherein the first and second external pins are configured to be coupled with a ground line and a signal line, respectively, wherein power and an analog value are transmitted via the signal line;
 a third external pin for connection of an external power capacitor, wherein the external capacitor is coupled between the ground line and the single signal line;
 analog sensor circuitry operable to be powered by the power capacitor and further operable to output an analog output signal through the second external pin on the signal line once the power capacitor has been charged sufficiently.

12. The sensor device according to claim 11, wherein the analog sensor circuitry comprises an analog sensor unit coupled with a sensor output unit, wherein the sensor output unit feeds an analog output signal to the signal line.

13. The sensor device according to claim 12, wherein the analog output signal is a voltage.

14. The sensor device according to claim 12, wherein the analog output signal is a current.

15. The sensor device according to claim 11, further comprising a forward biased diode connected between the line and the external power capacitor.

16. The sensor device according to claim 11, further comprising a controllable switch connected between the signal line and the external power capacitor and a switch control unit operable to control the switch.

17. The sensor device according to claim 16, wherein the controllable switch is a MOSFET.

18. The sensor device according to claim 16, wherein the switch control unit is configured to automatically control the switch to decouple the power capacitor from the signal line once a predefined charge level has been reached.

19. The sensor device according to claim 11, wherein the analog sensor circuitry is configured to output the analog output signal at least during a predefined time window after the power capacitor of the sensor device has been sufficiently charged.

20. The sensor device according to claim 19, wherein the analog sensor circuitry is further configured to indicate an end of a measurement cycle by pulling down a signal on the signal line.

21. A method for operating an integrated sensor device through an interface having only two lines, wherein one line is a ground connection and the other line is a signal line, the method comprising the steps:
 applying a supply voltage to the signal line by a controller coupled with the integrated sensor device through the interface for a predetermined time;
 performing an analog sensor measurement within the integrated sensor device;
 outputting an analog sensor signal on the signal line by the integrated sensor device;
 measuring the analog sensor signal by the controller.

22. The method according to claim 21, wherein the controller is a microcontroller and the signal line is connected to an input/output (I/O) port of a microcontroller, wherein the I/O port is configured to operate at least as a digital output port or as an analog input port.

23. The method according to claim 22, wherein the microcontroller is programmed to perform the method steps.

24. The method according to claim 21, further comprising the step of pulling down the signal line by the integrated sensor device after a time period has passed from said predetermined time period to indicate the end of a measuring cycle.

25. The method according to claim 21, wherein said pulling down is performed multiple times.

* * * * *